United States Patent
Schult et al.

(10) Patent No.: US 10,454,276 B2
(45) Date of Patent: Oct. 22, 2019

(54) POWER CONVERTER

(71) Applicant: ABB Technology Oy, Helsinki (FI)

(72) Inventors: Matthias Schult, Mülligen (CH); Christian Schlegel, Uitikon (CH); Dominik Flum, Weilheim (DE); John Eckerle, Basel (CH)

(73) Assignee: ABB Schweiz AG, Baden (CH)

( * ) Notice: Subject to any disclaimer, the term of this patent is extended or adjusted under 35 U.S.C. 154(b) by 67 days.

(21) Appl. No.: 15/707,162

(22) Filed: Sep. 18, 2017

(65) Prior Publication Data

US 2018/0069404 A1 Mar. 8, 2018

Related U.S. Application Data

(63) Continuation of application No. PCT/EP2016/054583, filed on Mar. 3, 2016.

(30) Foreign Application Priority Data

Mar. 16, 2015 (EP) ..................... 15159211

(51) Int. Cl.
*H02J 9/00* (2006.01)
*H02J 3/38* (2006.01)
(Continued)

(52) U.S. Cl.
CPC ............. *H02J 3/386* (2013.01); *H02M 1/126* (2013.01); *H02M 5/4585* (2013.01); *H02M 7/125* (2013.01); *Y02E 10/763* (2013.01)

(58) Field of Classification Search
CPC ...... H02M 3/386; H02M 1/126; H02M 7/125; H02M 5/4585; H02J 3/386; Y02F 10/763
(Continued)

(56) References Cited

U.S. PATENT DOCUMENTS

| | | | | |
|---|---|---|---|---|
| 6,128,204 A | * | 10/2000 | Munro | H02J 3/44 318/140 |
| 7,092,262 B2 | * | 8/2006 | Ryan | H02M 7/062 323/207 |
| 8,253,273 B2 | * | 8/2012 | Fredette | H02M 1/10 307/51 |

FOREIGN PATENT DOCUMENTS

DE 102007021930 A1 1/2008
EP 2871759 A1 5/2015
(Continued)

OTHER PUBLICATIONS

Galindo-Del-Valle, et al., On the Emulation of an Isolated Wind Energy Conversion System: Experimental Results, 2009 Electronics, Robotics and Automotive Mechanics Conference, 6 pages.
(Continued)

*Primary Examiner* — Dinh T Le
(74) *Attorney, Agent, or Firm* — Taft Stettinius & Hollister LLP; J. Bruce Schelkopf

(57) ABSTRACT

A method is provided for connecting a main converter, e.g. for use in a power plant for regenerative energy having a generator, to a power grid. The method includes providing energy from the pre-charge unit to at least one of at least two converter paths. The at least one converter path is pre-charged using the energy provided from the pre-charge unit. At least one further converter path of the at least two converter paths is pre-charged using the energy provided from the pre-charge unit via the at least one converter path through the grid side converter of the at least one converter path and the grid side converter of the at least one further converter path. The main converter is connected to the power grid by closing the grid breaker.

6 Claims, 6 Drawing Sheets

(51) Int. Cl.
*H02M 5/458* (2006.01)
*H02M 7/12* (2006.01)
*H02M 1/12* (2006.01)

(58) Field of Classification Search
USPC .............................................. 307/64, 51, 36
See application file for complete search history.

(56) References Cited

FOREIGN PATENT DOCUMENTS

| WO | 2010058028 | A2 | 5/2010 |
|---|---|---|---|
| WO | 2012163398 | A1 | 12/2012 |
| WO | 2013007268 | A2 | 1/2013 |
| WO | 2013007268 | A3 | 1/2013 |

OTHER PUBLICATIONS

Partial European Search Report, EP15159211, ABB Technology Oy, dated Jun. 25, 2015, 4 pages.
Internatonal Search Report and Written Opinion, PCT/EP2016/054583, ABB Technology Oy, dated Apr. 28, 2016, 8 pages.

* cited by examiner (State of the Art)

(State of the Art)

POWER CONVERTER

TECHNICAL FIELD

The present invention relates to the area of main converters e.g. for use in a power plant for regenerative energy having a generator, to a power grid, the main converter comprising a grid breaker provided at a power grid side of the main converter, and at least one converter path comprising a central DC link, a grid side converter and a generator side converter, both connected to the DC link. In particular, the present invention relates to the area of operation of such main converters. Still more particular, the present invention relates to the area of pre-charging such main converters.

BACKGROUND ART

Power plants for regenerative energy are typically connected via a main converter to a power grid. Power plants for regenerative energy may comprise wind turbine plants (WTP) or tidal turbine plant (TTP), using a generator for generating electrical energy. The main converter comprises means for adapting the power provided from the power plant, so that it can be introduced into the power grid. Hence, the main converter can perform adaptation of voltage levels, frequency and/or phase of the power plant to the power grid.

A typical main converter for connecting power plants for regenerative energy to a power grid comprises a grid breaker for connecting to and disconnecting from the power grid, and at least one converter path comprising a central DC link. Further converter paths can be provided in parallel depending on the design of the main converter, whereby the converter paths may have a similar or identical design. Each of the at least one converter paths comprises a central DC link, a grid side converter and a generator side converter, both connected to the DC link. In some embodiments, the main converter further comprises a main transformer for adapting the voltage level of the provided energy to the voltage level of the power grid. In some embodiments, the main transformer is provided separately from the main converter.

The grid breaker (GRB) can be used to disconnect the main converter together with the transformer from the power grid. When the main transformer is provided, separately from the main converter, only the main converter with the converter paths is disconnected by the GRB. Accordingly, if the main converter should be connected to the grid, the main converter's DC link has to be charged. When the main converter comprises the main transformer, also the main transformer has to be magnetized prior to connecting it to the power grid, since the main transformer is major source for inrush currents upon connection to the power grid. Precharging reduces inrush currents, which may harm the main converter, to a minimum. Furthermore, also the impact of the inrush currents to the power grid voltage level is minimized by connecting a pre-charged main converter instead of a uncharged one. Pre-charging may also include optional components of the main converter, e.g. a high frequency grid filter provided at the power grid side of the grid side converter.

State of the art WTPs or TTP may have a topology, in which the main transformer is not disconnected at any time from the grid when the converter is disconnected. The main transformer stays always magnetized. If the main converter then is connected to the grid, the resulting inrush current is smaller, because it originates only from the charging of the main converter's DC link and from the magnetization of further optional components, e.g. a high frequency grid filter. This topology means that the GRB is located at the main transformer's secondary side.

Another established solution is the usage of a pre-charge unit (PCU) for feeding the main converter from the power grid, typically via an auxiliary transformer. This PCU loads the main converter's DC link with nominal DC voltage, as long as the grid side converter magnetizes the main transformer and e.g. an optional high frequency grid filter. The GRB is not closed until the magnetization is finalized, i.e. means voltage amplitude and phase on GRB's primary and secondary side are the same. This way, an inrush current is avoided or at least highly reduced. Typically, the used PCU is dimensioned to deliver the energy that is needed to magnetize the main converter only. This means that the power class of the PCU is much lower than the power class of the WTP or the TTP.

A third established solution is a phase selective switchgear which closes the single phases of the GRB in the moment of each phases voltage amplitude is at its maximum. This type of phase selective switchgear is much more expensive than a usual one.

WO 2013/007288 A2 discloses a method for connecting a main converter, especially for use in a power plant for regenerative energy, having a generator, to a power grid, the main converter comprising a grid breaker provided at a power grid side of the main converter, and at least one converter path, each converter path comprises a DC link, a grid side converter and a generator side converter, both connected to the DC link.

In R. Galindo del Valle et al. "On the Emulation of an Isolated Wind Energy Conversion System: Experimental Results", ELECTRONICS, ROBOTICS AND AUTOMOTIVE MECHANICS CONFERENCE, 2009. CERMA 09, IEEE, PISCATAWAY, N.J., U.S.A., 22 Sep. 2009, an isolated wind energy conversion system is disclosed, which is composed by a doubly-fed induction generator, a back-to-back converter connected to its rotor and a LC filter.

DE 10 2007 021 930 A1 shows a well-known and generic method for switching-ON of a power semiconductor in a converter plant.

WO 2012/163398 A1 shows a system for distributing electric power to an electrical grid, whereby the system comprises a DC/AC inverter arranged to convert a DC voltage output from an electric power generator to an AC voltage, a transformer arranged to receive said AC voltage, transform said AC voltage and deliver the transformed AC voltage to the grid and a connector arranged to selectively connect and disconnect the transformer from the grid.

DISCLOSURE OF INVENTION

It is an object of the present invention to provide a method for connecting a main converter e.g. for use in a power plant for regenerative energy having a generator, to a power grid, and a main converter for applying this method, which achieves pre-charging of the main converter in a simple and to reduce the amount of additional hardware required for pre-charging.

This object is achieved by the independent claims. Advantageous embodiments are given in the dependent claims.

The object is solved by a method for connecting a main converter e.g. for use in a power plant for regenerative energy having a generator, to a power grid, the main converter comprising a grid breaker provided at a power grid side of the main converter, and at least two converter paths comprising each a central DC link, a grid side converter and a generator side converter, both connected to the DC link, and a pre-charge unit connected to the power grid and to at least one of the at least two converter paths, comprising the steps of providing energy from the pre-charge unit to at least one of the at least two converter paths, pre-charging the at least one converter path using the energy provided from the pre-charge unit, pre-charging at least one further converter path of the at least two converter paths using the energy provided from the pre-charge unit via the at least one converter path through the grid side converter of the at least one converter path and the grid side converter of the at least one further converter path, and connecting the main converter to the power grid by closing the grid breaker. Hence, one or multiple pre-charge units are used to pre-charge a respective number of converter paths. The remaining converter paths are pre-charged merely by energy from those converter paths, which is pre-charged from the pre-charge units. Preferably, only one pre-charge unit is provided to pre-charge one converter path directly, and all remaining converter paths and additional components, e.g. a main transformer, high frequency grid filters, or others are charged via this single pre-charge unit. According to this embodiment, hardware requirements are reduced by merely providing at least one pre-charge unit.

The present invention also provides a main converter e.g. for use in a power plant for regenerative energy having a generator, connected to a power grid, the main converter comprising a grid breaker provided at a power grid side of the main converter, and at least one converter path comprising a DC link, a grid side converter and a generator side converter, both connected to the DC link, whereby the main converter is adapted to perform the above method.

The present invention also provides a software package for upgrading a main converter e.g. for use in a power plant for regenerative energy having a generator, connected to a power grid, the main converter comprising a grid breaker provided at a power grid side of the main converter, and at least one converter path comprising a DC link, a grid side converter and a generator side converter, both connected to the DC link, whereby the software package contains instructions for controlling the main converter to perform the above method.

Furthermore, a method being not part of the invention for connecting a main converter e.g. for use in a power plant for regenerative energy having a generator, to a power grid, the main converter comprising a grid breaker provided at a power grid side of the main converter, and at least one converter path, each converter path comprises a DC link, a grid side converter and a generator side converter, both connected to the DC link, comprising the steps of providing energy from the power plant to the at least one converter path, pre-charging the at least one converter path using the energy provided from the power plant, and connecting the main converter to the power grid by closing the grid breaker.

The basic idea of this method being not part of the invention is to modify the control of the main converter to make energy available from the power plant usable for pre-charging. Hence, when the generator of the power plant is already turning, e.g. the generator is already driven by wind or tidal forces, the produced energy can be used for pre-charging the main converter. This reduces the needs for additional hardware, which has to be provided in the state of the art only for the purpose of pre-charging. It is merely required to modify the main converter to enable pre-charging from the power plant. Hardware, which is in the state of the art only used for pre-charging the main converter, can be reduced or even omitted. Since the power class of the energy source used for this kind of pre/charging/magnetization is bigger than the power class of a pre-charge unit, it is possible to not only pre-charge and magnetize the components of the main converter itself. Also other transformers and converter components disconnected from the grid by the same grid breaker could be pre-charged and/or magnetized before the grid breaker is closed to avoid inrush currents.

The at least one converter path is connected between the generator side and the power grid side of the main converter. It is possible that the main converter comprises only one converter path. Typically, multiple converter paths are connected in parallel to each other so that the total load for the main converter can be split to multiple converter paths. The multiple converter paths are typically connected together on the grid side prior to the grid breaker. In case the main converter comprises a main transformer, the multiple converter paths are typically connected together on the grid side prior to the main transformer. In any case, the multiple converter paths are directly connected to each other. Alternatively, the multiple converter paths might also be connected to each other by the main transformer having multiple parallel windings on its main converter side.

The power grid can be any kind of power grid, typically a mid-range voltage power grid with a voltage of 10 to 30 kV. Depending on the voltage of the power grid, a main transformer can be required to connect the power plant to the power grid. The main transformer can be provided with the main converter or separately. The output of the grid side converter is typically provided with a voltage of up to 10 kV, more typically of 1 kV to 5 kV, e.g. with a voltage of 3 kV.

The generator and grid side converters convert AC into DC or vice versa, typically having semiconductor components including diodes.

According to a modified embodiment being not part of the invention the generator is a synchronous generator, the step of providing energy from the power plant to the main converter comprises operating the generator at nominal speed or a speed level close to nominal speed, preferably a speed level of at least 50% of nominal speed, and the step of pre-charging the at least one converter path using the energy provided from the power plant comprises operating the generator side converter passively. The use of a synchronous generator implies that the provided voltage is proportional to the generator speed. Hence, Nominal speed for a synchronous generator means nominal AC voltage. A voltage close to nominal AC voltage means, that the main converter can be pre-charged passively by the diodes of the generator side's converter. If the speed level of the generator is kept constant close to its nominal speed, the resulting constant DC link voltage allows the grid side converter to magnetize the converter path and other optional components, e.g. a main transformer or a high frequency grid filter, prior to closing the grid breaker and connecting the power plant to the power grid. This allows the grid side converter to magnetize also a main transformer and other optional components of the main converter, e.g. a high frequency grid filter, before the grid breaker is closed.

According to a modified embodiment being not part of the invention the generator is a synchronous generator, the step of providing energy from the power plant to the main converter comprises operating the generator at any speed level at or below nominal speed, and the step of pre-charging the at least one converter path using the energy provided from the power plant comprises operating the generator side converter actively. The use of a synchronous generator implies that the provided voltage is proportional to the generator speed. Hence, nominal speed for a synchronous generator means nominal AC voltage. Nevertheless, with active operation of the generator side converter, also lower voltage levels can be used to pre-charge the main converter. The generator side converter manages to increase the terminal voltage level, so that the DC link voltage can be controlled at a constant level. This allows the grid side converter to magnetize also a main transformer and other optional components of the main converter, e.g. a high frequency grid filter, before the grid breaker is closed. Nevertheless, active control of the generator side converter can also be applied in case of nominal speed of the generator.

According to a modified embodiment being not part of the invention the generator is an induction generator, the step of providing energy from the power plant to the main converter comprises operating the generator at any speed level below nominal speed with energy generation based on magnetic remanence of the generator, and the step of pre-charging the at least one converter path using the energy provided from the power plant comprises operating the generator side converter actively. With active operation of the generator side converter, the energy provided from the generator based on the remanence can be used for pre-charging the main converter and further components. Hence, pre-charging can also be applied when using induction generators.

According to a modified embodiment being not part of the invention the method comprises the additional step of controlling the generator and/or the generator side converter to increase the magnetic remanence of the generator, and disconnecting the main converter from the power grid by opening the grid breaker. Increasing the remanence prior to disconnecting the generator facilitates a subsequent start-up of the generator. Hence, more energy can be provided from the generator at start-up by increasing the magnetic remanence of the induction generator prior to disconnecting it from the power grid or from the main converter. The induction generator is preferably disconnected from the main converter by use of a generator breaker provided at the generator side of the main converter.

According to a modified embodiment being not part of the invention the method comprises the additional step of pre-charging at least one further converter path using the energy provided from the power plant prior to closing the grid breaker. Hence, each converter path is pre-charged directly from the generator, i.e. via its generator side converter. Accordingly, the control of all converter paths can be implemented in the same way.

According to a modified embodiment being not part of the invention the method comprises the additional step of pre-charging at least one further converter path using the energy provided from the power plant via the at least one converter path prior to closing the grid breaker. Hence, only the at least one converter path can be provided to receive the energy for pre-charging from the generator, and distribute the energy to the at least one further converter path via the power grid side. Accordingly, the at least one converter path has the function of receiving the energy from the power plant via its generator side converter, whereas the at least one further converter path receives the energy via its power grid side converter. Hence, in the at least one further converter path, only the control of the power grid side converter has to be modified.

According to a modified embodiment being not part of the invention the steps of pre-charging the at least one converter path and pre-charging the at least one further converter path are performed subsequently. Hence, only the at least one converter path is pre-charged directly from the generator, i.e. via its generator side converter, whereas the at least one further converter path is pre-charged via its grid side converter. Depending on the design of the main converter and the power plant, e.g. on the power available from the generator of the power plant, pre-charging can be performed in a suitable way to efficiently use energy provided from the power plant. Subsequent pre-charging avoids overload conditions of the power plant at start-up. The same principles apply to pre-charging of parallel converter paths and other, optional components.

According to a modified embodiment being not part of the invention the at least one converter path comprises a main transformer, the method comprising the additional step of pre-charging the main transformer using the energy provided from the power plant. In other embodiments, the main transformer can be provided separately from the main converter. Nevertheless, also in the ether embodiments, the main converter can be controlled to pre-charge the main transformer. Hence, inrush currents based on the magnetization of the main transformer can be securely reduced in both cases. With the main transformer forming part of the main converter, the converter can be directly used to connect the power plant to power grids having voltage levels, which are typically not realized by a converter, e.g. voltage levels of 10 to 30 kV of a mid voltage power grid.

According to a modified embodiment being not part of the invention the at least one converter path comprises a high frequency grid filter arranged between the grid side converter of the at least one converter path and the power grid, and the method composing the additional step of pre-charging the high frequency grid filter using the energy provided from the power plant. The high frequency grid filter is used to filter high frequency components of the output voltage of the grid side converter, which might cause problems in the power grid. With pre-charging the high frequency grid filter, also inrush currents based on chargeable components of the high frequency grid filter can be avoided or reduced.

According to a modified embodiment being not part of the invention the at least one converter path comprises a dV/dt filter for limiting the slew rate, which is arranged between the generator side converter of the at least one converter path and the generator, and the step of providing energy from the power plant to the at least one converter path comprises limiting the slew rate of the voltage of the provided energy. The dV/dt filter limits the increase of the voltage e.g. in case of switch events or in normal operation, which facilitates the operation of the generator side converter.

According to a modified embodiment being not part of the invention the at least one converter path comprises a generator breaker arranged between the generator side converter of the at least one converter path and the generator, and the step of providing energy from the power plant to the at least one converter path comprises closing the generator breaker. The generator breaker can be used to connect or disconnect the generator of the power plant. In an alternative embodiment, a disconnector which allows zero-potential switching is used to disconnect the generator side converter from the generator.

BRIEF DESCRIPTION OF DRAWINGS

These and other aspects of the invention will be apparent from and elucidated with reference to the embodiments described hereinafter.

In the drawings.

DETAILED DESCRIPTION OF THE INVENTION

Figure 1:
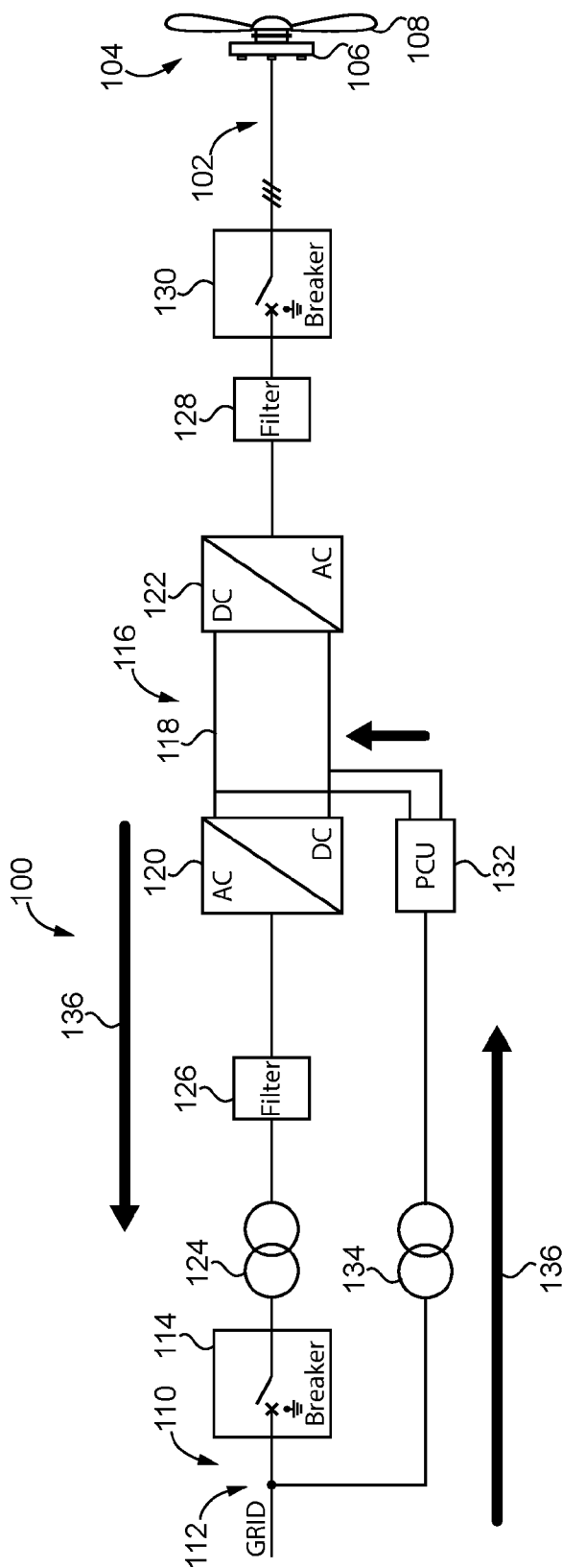
FIG. 1 shows a schematic view of a main converter with a single converter path connected to a regenerative power plant according to the state of the art.

FIG. 1 shows a main converter 100 according to the state of the art. The main converter 100 is connected on its generator side 102 to a power plant 104 for regenerative energy having a generator 106 and a wind turbine 108. On its power grid side 110, the main converter 100 is connected to a power grid 112.

The main converter 100 comprises a grid breaker 114 provided at the power grid side 110 of the main converter 100 and one converter path 116. The converter path 116 composes a DC link 118, a grid side converter 120 and a generator side converter 122, both connected to the DC link 118. Furthermore, the converter path 116 comprises a high frequency grid filter 126 provided at the power grid side 110 of the grid side converter 122. At the generator side 102, the converter path 116 comprises a dV/dt filter 128 for limiting the slew rate and a generator breaker 130. A main transformer 124 is provided between the grid breaker 114 and the converter path 116.

The state of the art main converter 100 further comprises a pre-charge unit 132, which is connected to the power grid 112 via a pre-charge transformer 134. The pre-charge unit 132 is further connected to the DC link 118 of the converter path 116 for pre-charging.

Energy flow during pre-charge is indicated by arrows 136. Accordingly, before closing the grid breaker 114, energy is provided from the power grid 112 via the pre-charge transformer 134 and the pre-charge unit 132 to the DC link 118 of the converter path 116. After pre-charging the DC link 118, energy is provided from the DC link 118 via grid side converter 120 to the high frequency grid filter 126 and the main transformer 124 for pre-charging. This includes magnetization of the main transformer 124. After pre-charging has finished, the grid breaker 114 is closed end the power plant 104 is connected via the main converter 100 to the power grid 112.

Figure 2:
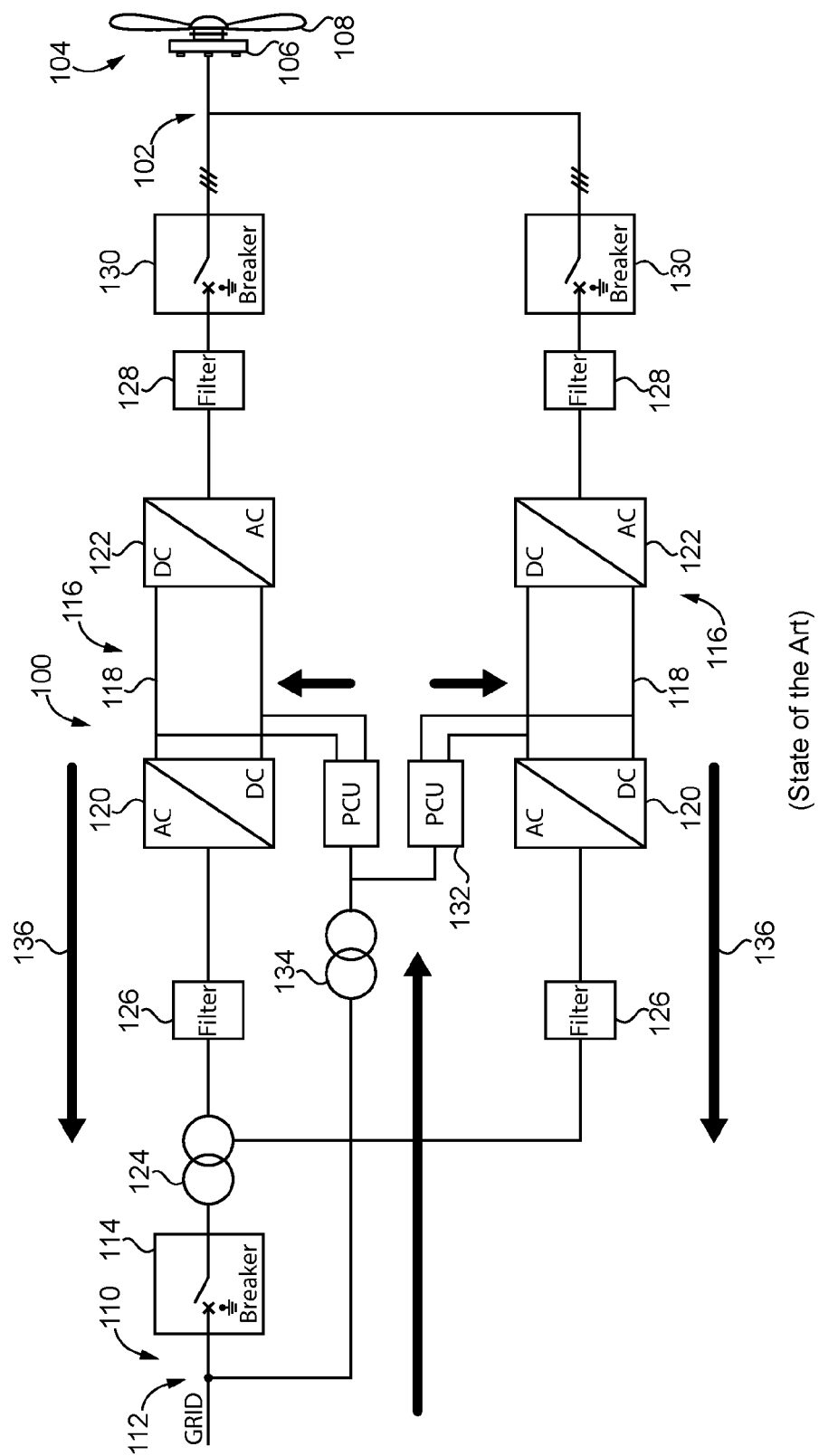
FIG. 2 shows a schematic view of a main converter with a two converter paths connected to a regenerative power plant according to the state of the art.

FIG. 2 shows another main converter 100 according to the state of the art. The main converter 100 differs from the main converter of FIG. 1 in that it comprises two converter paths 116, which have the same structure. The converter paths 116 are connected to each other on the power grid side 110 prior to being connected to the main transformer 124 or, alternatively, are connected to two parallel windings of the main transformer on its converter side; for example one winding might be a star-connected winding and the other winding might be a delta-connected winding. Furthermore, the main converter 100 differs from the main converter of FIG. 1 in that a pre-charge unit 132 is provided for pre-charging each converter path 116 independently. The pre-charge units 132 are connected via a single pre-charge transformer 134 to the power grid 112. The remaining details of the main converter 100 of FIG. 2 correspond to the main converter 100 of FIG. 1, so that a repeated description is omitted. Also in FIG. 2 energy flow during pre-charge is indicated by arrows 136. Accordingly, before closing the grid breaker 114, energy is provided from the power grid 112 via the pre-charge transformer 134 and the pre-charge units 132 to the DC links 118 of the two converter paths 116. After pre-charging the DC links 118, energy is provided from the DC links 118 via grid side converters 120 to the high frequency grid filters 126 and the main transformer 124 for pre-charging. This includes magnetization of the main transformer 124. After pre-charging has finished, the grid breaker 114 is closed and the power plant 104 is connected via the main converter 100 to the power grid 112.

Figure 3:
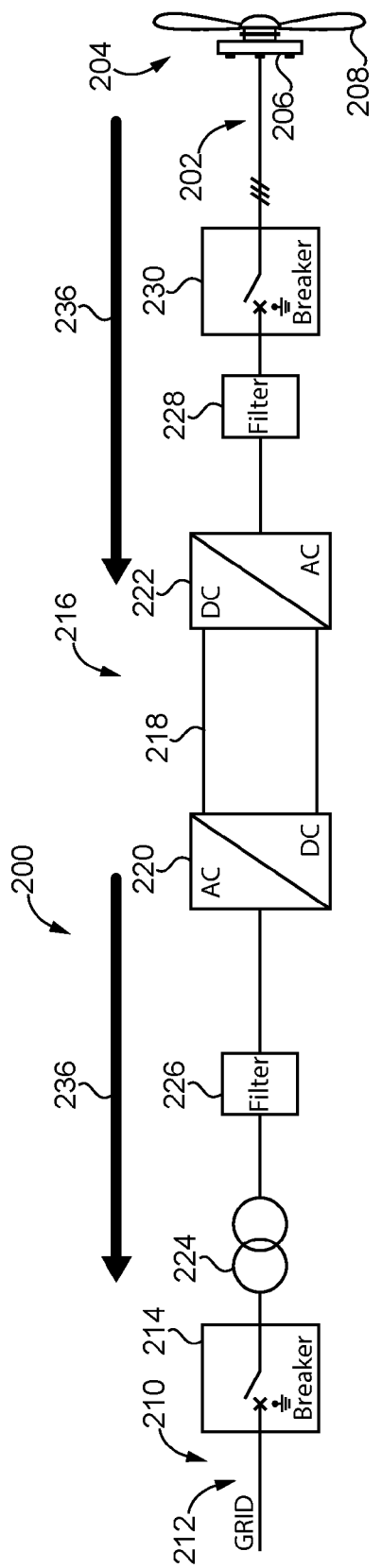
FIG. 3 shows a schematic view of a main converter with a single converter path connected to a regenerative power plant according to a first embodiment being not part of the invention.

FIG. 3 shows a main converter 200 according to a first embodiment. The main converter 200 is connected on its generator side 202 to a power plant 204 for regenerative energy having a generator 206 and a wind turbine 208. On its power grid side 210, the main converter 200 is connected to a power grid 212. The power grid 212 in this embodiment is a mid-range voltage power grid with a voltage of 10 to 30 kV.

The main converter 200 of the first embodiment comprises a grid breaker 214 provided at the power grid side 210 of the main converter 200 and one converter path 216. The converter path 216 comprises a DC link 218, a grid side converter 220 and a generator side converter 222, both connected to the DC link 218. The generator side converter 222 converts AC provided from the generator 206 of the power plant into DC for the DC link 218. The grid side converter 220 converts DC from the DC link 218 into AC. Generator and grid side converter 220, 222 have semiconductor components including diodes as well as semiconductor switches.

Furthermore, the converter path 216 comprises a high frequency grid filter 226 provided at the power grid side 210 of the grid side converter 222. At the generator side 202, the converter path 216 comprises a dV/dt filter 228 for limiting the slew rate and a generator breaker 230. A main transformer 224 is provided between the grid breaker 214 and the converter path 216. The output of the grid side converter 220 is provided in this embodiment with a voltage of 3 kV. Hence, the main transformer 224 transforms this voltage into the voltage of the power grid 212.

Energy flow during pre-charge is indicated by arrows 236. Accordingly, before closing the grid breaker 214, energy is provided from the power plant 204 to the converter path 216 via the generator side converter 222 for pre-charging all components of the converter path 216, in particular its DC link 218. Furthermore, after pre-charging the DC link 218, energy is provided from the DC link 218 via the grid side converter 220 to the high frequency grid filter 226. Still further, energy is provided from the DC link 218 to the main transformer 224 for pre-charging, including magnetization of the main transformer 224. After pre-charging has finished, the grid breaker 214 is closed, and the main converter 200 is connected to the power grid 212. Thereby, also the power plant 204 is connected to the power grid 212.

Pre-charging as indicated above is performed by a mere control of the main converter 200 to enable pre-charging from the energy from the power plant 204. Further details are given below. The details refer to all embodiments, and are given by way of example only for the first embodiment.

In one embodiment, the generator 206 is a synchronous generator. When energy is provided from the power plant 204 to the main converter 200, the generator 206 is operated at nominal speed or a speed level close to nominal speed, preferably a speed level of at least 50% of nominal speed. Hence, the generator side converter 222 can be operated passively to provide energy to the DC link 218. Pre-charging of the main converter 200 is performed as described above.

In another embodiment, the generator 206 is a synchronous generator. When energy is provided from the power plant 204 to the main converter 200, the generator 206 is operated at any speed level at or below nominal speed. Hence, the generator side converter 222 is operated actively to provide energy to the DC link 218. Hence, the generator side converter 222 increases the terminal voltage level of the generator 206, so that the voltage of the DC link 218 is obtained at a constant level. Pre-charging of the main converter 200 is performed as described above.

In yet another embodiment, the generator 206 is an induction generator. When energy is provided from the power plant 204 to the main converter 200, the generator 206 is operated at any speed level at or below nominal speed, whereby energy generation of the generator 206 is based on magnetic remanence. Furthermore, the generator side converter 222 is operated actively to provide energy to the DC link 218. The generator side converter 222 increases the terminal voltage level of the generator 206, so that the voltage of the DC link 218 is obtained at a constant level. Pre-charging of the main converter 200 is performed as described above.

In respect to this embodiment, the method for connecting the main converter to a power grid also includes re-connecting the main converter to a power grid after the main converter had been disconnected from the power grid. Pre-charging is facilitated by increasing the remanence of the generator 206 prior to disconnecting the grid breaker 214. Hence, the generator 206 and/or the generator side converter 222 are controlled to increase the magnetic rernanenoe of the generator 206. Subsequently, the main converter 200 is disconnected from the power grid 212 by opening the grid breaker 214. In this embodiment, the generator 206 can be disconnected from the main converter 200 by use of the generator breaker 230. The further process steps for the pre-charging of the main converter 200 is performed as described above.

Figure 4:
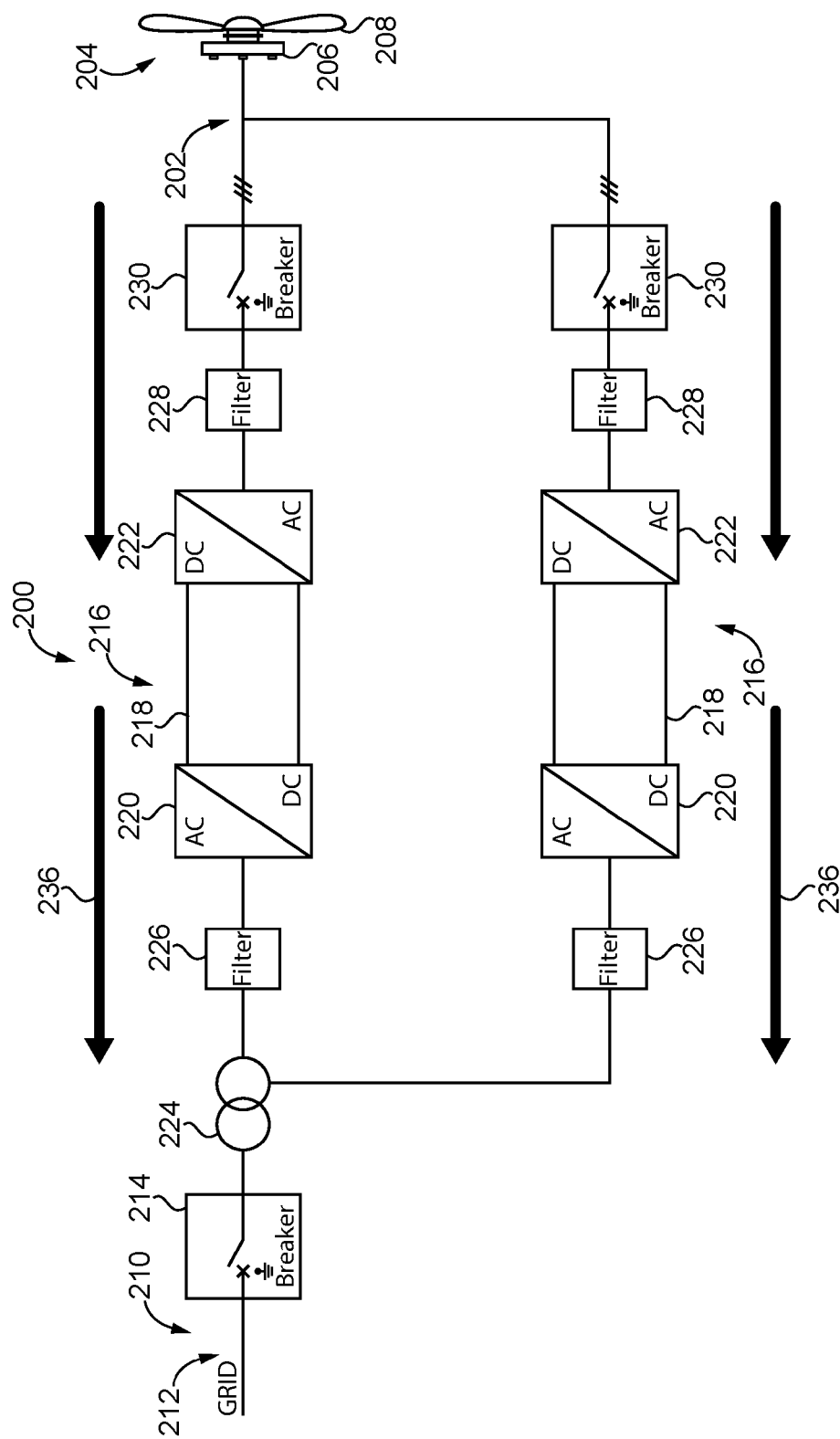
FIG. 4 shows a schematic view of a main converter with two converter paths connected to a regenerative power plant according to a second embodiment being not part of the invention.
Figure 5:
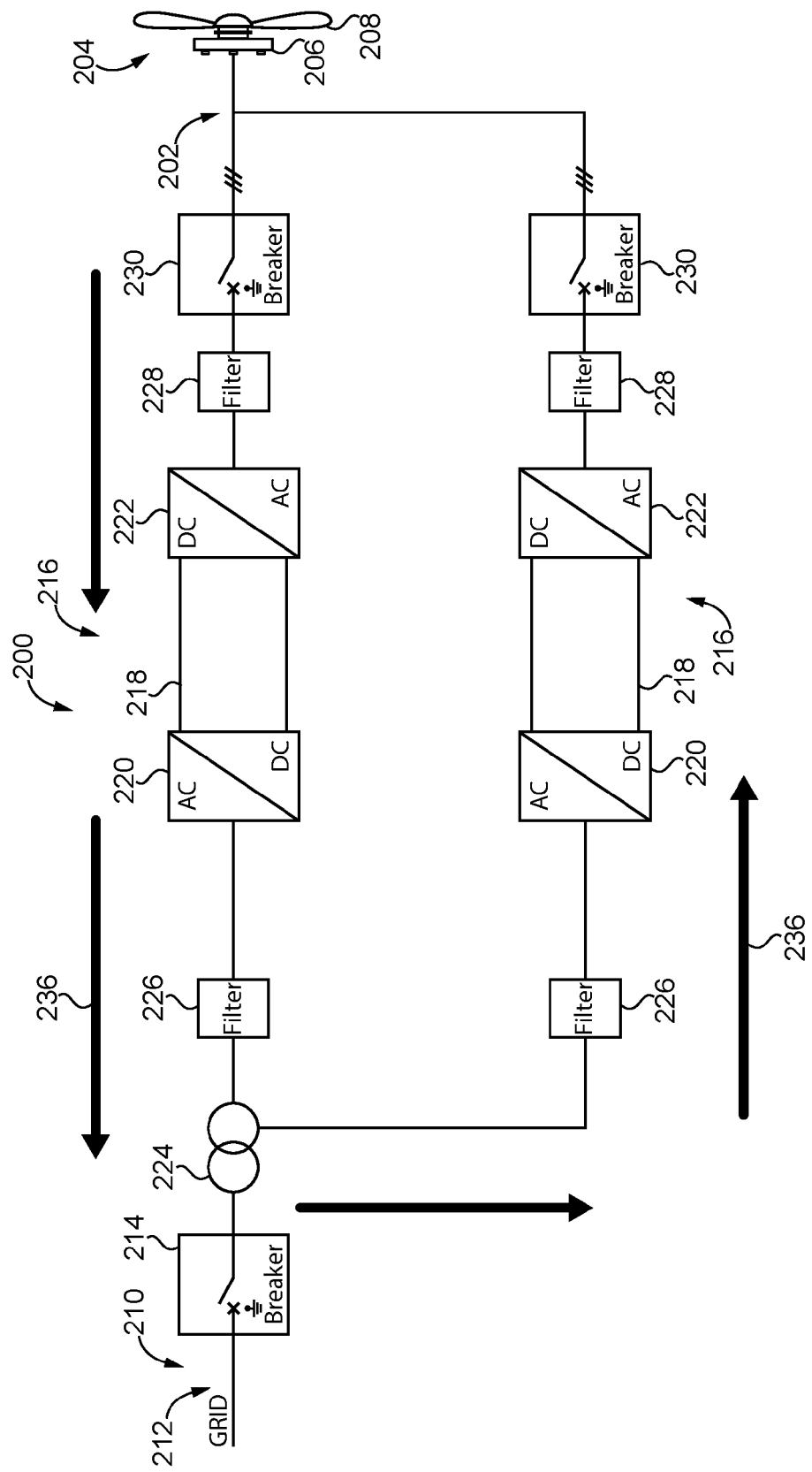
FIG. 5 shows a schematic view of a main converter with two converter paths connected to a regenerative power plant according to a third embodiment being not part of the invention.

FIGS. 4 and 5 show a main converter 200 according to a second and third embodiment, respectively. The main converters 200 according to a second and third embodiment have an identical structure and only differ in respect to the way they are controlled to achieve pre-charging. Hence, the main converters 200 according to a second and third embodiment are described together. Furthermore, main converters 200 according to a second and third embodiment are based on the main converter 200 of the first embodiment, whereby components, which are not described explicitly, are identical to those of the main converter 200 of the first embodiment.

The main converter 200 according to a second and third embodiment is connected on its generator side 202 to a power plant 204 for regenerative energy having a generator 206 and a wind turbine 208. On its power grid side 210, the main converter 200 is connected to a power grid 212. The main converter 200 further comprises a grid breaker 214 provided at the power grid side 210 of the main converter 200.

The main converter 200 according to a second and third embodiment comprises two converter paths 216. Each converter path 216 comprises a DC link 218, a god side converter 220 and a generator side converter 222, both connected to the DC link 218. Furthermore, each converter path 216 comprises a high frequency grid filter 226 provided at the power grid side 210 of the grid side converter 222. At the generator side 202, each converter path 216 comprises a dV/dt filter 228 for limiting the slew rate and a generator breaker 230.

A main transformer 224 is provided between the grid breaker 214 and the two converter paths 216. The converter paths 116 are connected to each other on the power grid side 210 prior to being connected to the main transformer 224 or, alternatively, are connected to two parallel windings of the main transformer on its converter side; for example one winding might be a star-connected winding and the other winding might be a delta-connected winding. Other windings are well known to the person skilled in the art. In particular, the windings might also of the same type. The output of the grid side converters 220 is provided in this embodiment with a voltage of 3 kV. Hence, the main transformer 224 transforms this voltage into the voltage of the power grid 212.

Since the operation for pre-charging the main converter 200 is different for the second and third embodiment, now only the operation of the main converter 200 of the second embodiment will be discussed.

First, the second embodiment is described with reference to FIG. 4. Energy flow during pre-charge is indicated by arrows 236. Before closing the grid breaker 214, energy is provided from the power plant 204 via the generator side converter 222 to the two converter paths 216 for pre-charging all components of the converter paths 216. The energy is provided directly from the power plant 204 to the respective generator side converters 222 of the two converter paths 216, so that both converter paths 216 are pre-charged in parallel. This includes in both cases pre-charging the respective DC links 218 as well as providing energy via the grid side converters 220 to the high frequency grid filters 226. Finally, also the main transformer 224 is pre-charged based on the energy provided via the two converter paths 216. After pre-charging has finished, the grid breaker 214 is closed and the main converter 200 is connected to the power grid 212. Thereby, also the power plant 204 is connected to the power grid 212.

Now, the third embodiment is described with reference to FIG. 5. Energy flow during pre-charge is indicated by arrows 236.

Before closing the grid breaker 214, energy is provided from the power plant 204 to one of the two converter paths 216, which is the upper converter path 216 in the embodiment shown in FIG. 5. Nevertheless, there are no structural differences between the two converter paths 216, and the operation of the two converter paths 216 can be exchanged. The other of the two converter paths 216 is named lower converter path or further converter path. Obviously, instead of one further converter path also a plurality of further converter paths might be present.

Accordingly, the generator side converter 222 receives energy from the power plant 204 for pre-charging the entire upper converter path 216 of the embodiment shown in FIG.

5. This includes pre-charging the DC link 218 and providing energy via the grid side converter 220 to the high frequency grid filter 226 of the upper converter path 216 of the embodiment shown in FIG. 5.

After pre-charging the upper converter path 216 of the embodiment shown in FIG. 5, also the main transformer 224 is pre-charged based on the energy provided via the upper converter path 216. Furthermore, also the lower converter path 216 as shown in FIG. 5 including the high frequency grid filter 226 is pre-charged. In particular, the DC link 218 of lower converter path 216 as shown in FIG. 5 is pre-charged via the grid side converter 220 with the energy provided from the upper converter path 216. After pre-charging has finished, the grid breaker 214 is closed and the main converter 200 is connected to the power grid 212. Thereby, also the power plant 204 is connected to the power grid 212. The order of pre-charging the different components can vary depending on a particular implementation.

Figure 6:
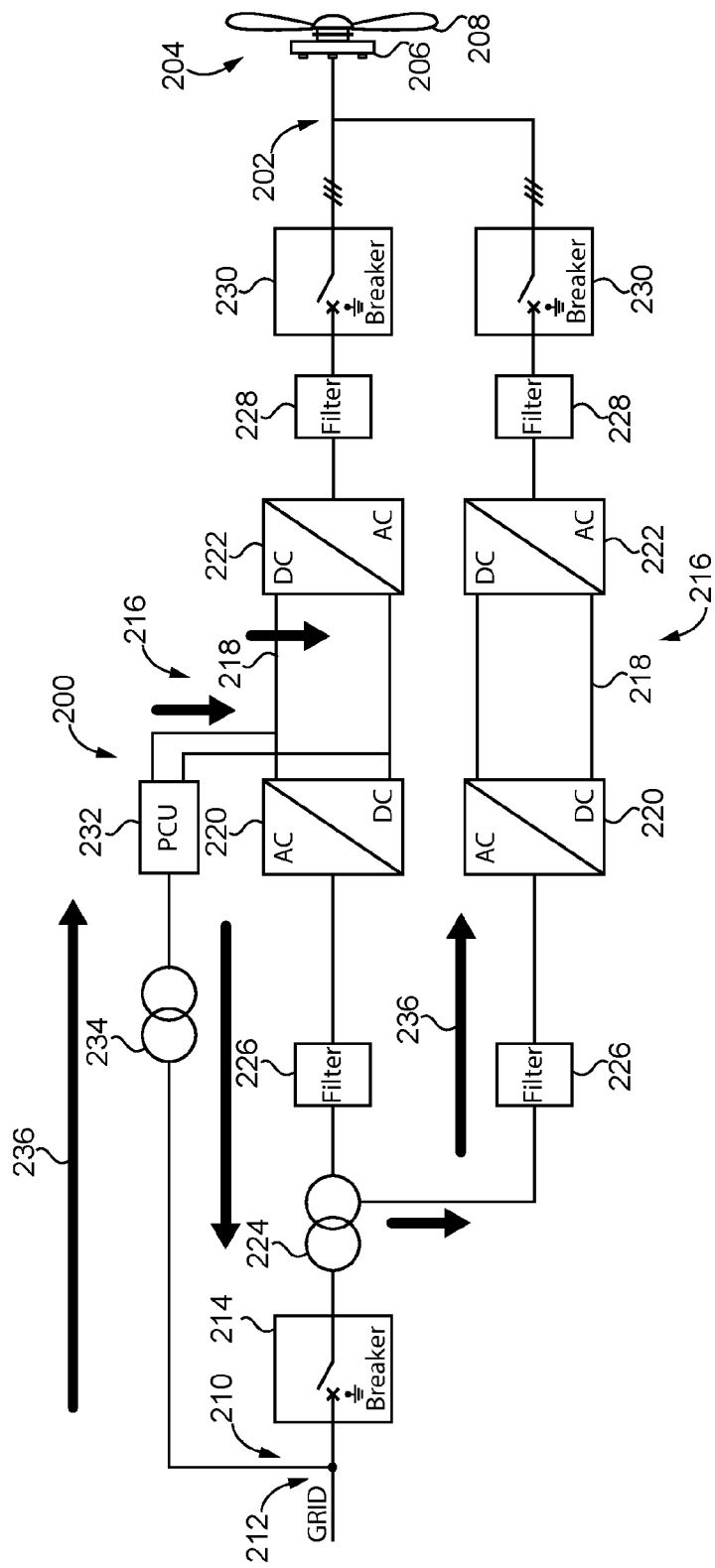
FIG. 6 shows a schematic view of a main converter with two converter paths and a pre-charge unit connected to a regenerative power plant according to an embodiment according to the invention.

FIG. 6 shows a main converter 200 according to an embodiment according to the invention. The main converter 200 according to the embodiment of FIG. 6 is based on the main converter 200 of the third embodiment, whereby components, which are not described explicitly, are identical to those of the main converter 200 of the third embodiment.

In addition to the main converter 200 of the third embodiment, the main converter 200 according to FIG. 6 comprises a pre-charge unit 232 and a pre-charge transformer 234, whereby the pre-charge unit 232 is connected to the power grid 212 via pre-charge transformer 234. Furthermore, the pre-charge unit 232 is connected to the DC link 218 of the upper converter path 216 of FIG. 6. In an alternative embodiment, the pre-charge unit 232 is connected at the generator side 202 of the main converter 200, e.g. between generator side converter 222 and generator breaker 230.

The operation of the main converter 200 according to FIG. 6 is similar to that of the main converter 200 of the third embodiment. Energy flow during pre-charge is indicated by arrows 236. Differences exist in the way the energy for pre-charging is provided, as discussed below in more detail.

Before closing the grid breaker 214, energy is provided from the power grid 212 via the pre-charge transformer 234 and the pre-charge unit 232 to the upper converter path 216 of the embodiment shown in FIG. 6. In this embodiment, the energy from the pre-charge unit 232 is provided directly to the DC link 218. In the alternative embodiment, where the pre-charge unit 232 is connected at the generator side 202 of the main converter 200, e.g. between generator side converter 222 and generator breaker 230, the DC-link 218 is charged via the generator side converter 222. Accordingly, the generator side converter 222 receives energy from the power grid 212 for pre-charging the entire upper converter path 216.

After pre-charging the DC link 218 of the upper converter path 216, energy is provided via the grid side converter 220 further to the high frequency grid filter 226 of the upper converter path 216. Furthermore, also the main transformer 224 is pre-charged based on the energy provided via the upper converter path 216. Still further, also the lower converter path 216, in particular its DC link 218, is pre-charged via its grid side converter 220 with the energy provided from the upper converter path 216. In particular, the DC link 218 of the lower converter path 216 is pre-charged via its grid side converter 220. After pre-charging has finished, the grid breaker 214 is closed and the main converter 200 is connected to the power grid 212. Thereby, also the power plant is connected to the power grid 212. The order of pre-charging the different components can vary depending on a particular implementation.

While the invention has been illustrated and described in detail in the drawings and foregoing description, such illustration and description are to be considered illustrative or exemplary and not restrictive; the invention is not limited to the disclosed embodiments. Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

REFERENCE SIGNS LIST 100 main converter (state of the art)
102 generator side (state of the art)
104 power plant (state of the art)
106 generator (state of the art)
108 wind turbine (state of the art)
110 power grid side (state of the art)
112 power grid (state of the art)
114 grid breaker (state of the art)
116 converter path (state of the art)
118 DC link (state of the art)
120 grid side converter (state of the art)
122 generator side converter (state of the art)
124 main transformer (state of the art)
126 high frequency grid filter (state of the art)
128 dV/dt filter (state of the art)
130 generator breaker (state of the art)
132 pre-charge unit (state of the art)
134 pre-charge transformer (state of the art)
136 energy flow during pre-charge (state of the art)
200 main converter
202 generator side
204 power plant
206 generator
208 wind turbine
210 power grid side
212 power grid
214 grid breaker
216 converter path
218 DC link
220 grid side converter
222 generator side converter
224 main transformer
226 high frequency grid filter
228 dV/dt Filter
230 generator breaker
232 pre-charge unit
234 pre-charge transformer
236 energy flow during pre-charge

The invention claimed is:

1. A method for connecting a main converter to a power grid, the main converter comprising a grid breaker provided at a power grid side of the main converter, and at least two converter paths comprising each a central DC link, a grid side converter and a generator side converter, both connected to the central DC link, and only one pre-charge unit connected to the power grid and to at least one of the at least two converter paths, comprising the steps of:

providing energy from the pre-charge unit to at least one of the at least two converter paths, pre-charging the at least one converter path using the energy provided from the pre-charge unit, pre-charging at least one further converter path of the at least two converter paths using the energy provided from the pre-charge unit via the at least one converter path through the grid side converter of the at least one converter path and the grid side converter of the at least one further converter path, and connecting the main converter to the power grid by closing the grid breaker.

2. The method according to claim 1, wherein a power plant for regenerative energy having a generator is connected to the generator side converter.

3. A main converter connected to a power grid, the main converter comprising a grid breaker provided at a power grid side of the main converter, and at least two converter paths comprising each a central DC link, a grid side converter and a generator side converter, both connected to the central DC link, and only one pre-charge unit configured for connecting to the power grid and to at least one of the at least two converter paths, wherein the main converter is configured to:

provide energy from the pre-charge unit to at least one of the at least two converter paths, pre-charge the at least one converter path using the energy provided from the pre-charge unit, pre-charge at least one further converter path of the at least two converter paths using the energy provided from the pre-charge unit via the at least one converter path through the grid side converter of the at least one converter path and the grid side converter of the at least one further converter path, and connect the main converter to the power grid by closing the grid breaker.

4. The main converter according to claim 3, in combination with a power plant for regenerative energy having a generator connected to the generator side converter.

5. A computer program product for connecting a main converter to a power grid, the main converter comprising a grid breaker provided at a power grid side of the main converter, and at least two converter paths comprising each a central DC link, a grid side converter and a generator side converter, both connected to the central DC link, and only one pre-charge unit configured for connecting to the power grid and to at least one of the at least two converter paths, wherein the computer program product contains instructions for controlling the main converter to:

provide energy from the pre-charge unit to at least one of the at least two converter paths, pre-charge the at least one converter path using the energy provided from the pre-charge unit, pre-charge at least one further converter path of the at least two converter paths using the energy provided from the pre-charge unit via the at least one converter path through the grid side converter of the at least one converter path and the grid side converter of the at least one further converter path, and connect the main converter to the power grid by closing the grid breaker.

6. The computer program product according to claim 5, wherein a power plant for regenerative energy having a generator is connected to the generator side converter.

* * * * *